US010656082B2

(12) United States Patent
Seo et al.

(10) Patent No.: US 10,656,082 B2
(45) Date of Patent: May 19, 2020

(54) SYSTEM AND METHOD FOR ADJUSTING TRANSMITTANCE FOR SUPERSENSITIVE OPTICAL SENSOR

(71) Applicant: KOREA INSTITUTE OF SCIENCE AND TECHNOLOGY, Seoul (KR)

(72) Inventors: Minah Seo, Seoul (KR); Yongsang Ryu, Seoul (KR); Young Min Jhon, Seoul (KR); Jaehun Kim, Seoul (KR); Taikjin Lee, Seoul (KR); Chulki Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 39 days.

(21) Appl. No.: 16/235,869

(22) Filed: Dec. 28, 2018

(65) Prior Publication Data

US 2019/0204215 A1    Jul. 4, 2019

(30) Foreign Application Priority Data

Jan. 2, 2018  (KR) ........................ 10-2018-0000351

(51) Int. Cl.
*G01N 21/55*  (2014.01)
*G01N 21/3581*  (2014.01)
*G02B 5/00*  (2006.01)

(52) U.S. Cl.
CPC ........... *G01N 21/3581* (2013.01); *G02B 5/00* (2013.01); *G01N 2201/068* (2013.01)

(58) Field of Classification Search
CPC ................ A61B 5/0071; A61B 5/0075; G01N 2021/6463; G01N 2021/6471; G01N 21/31; G01N 21/3581; G01N 2201/068
See application file for complete search history.

(56) References Cited

U.S. PATENT DOCUMENTS

2017/0059482 A1*  3/2017  Kim ..................... A61B 5/0071

FOREIGN PATENT DOCUMENTS

| KR | 10-0849928 B1 | 8/2008 |
| KR | 10-2012-0093629 A | 8/2012 |
| KR | 10-2017-0036891 A | 4/2017 |

OTHER PUBLICATIONS

D. Chung et al., "Screen printable flexible conductive nanocomposite polymer with applications to wearable sensors", Proc. of SPIE, Nanosensors, Biosensors, and Info-Tech Sensors and Systems, 2014, pp. 90600U-1~90600U-10.
Yong-Sang Ryu et al., "Ultrasensitive terahertz sensing of gold nanoparticles inside nano slot antennas", Optics Express, Nov. 27, 2017, pp. 30591-30597, vol. 25, No. 24.

* cited by examiner

*Primary Examiner* — Don K Wong
(74) *Attorney, Agent, or Firm* — Rabin & Berdo, P.C.

(57) ABSTRACT

A system for adjusting transmittance, according to the present disclosure, includes a sensing device configured to amplify electromagnetic waves of a specific frequency and a squeegee configured to concentrate a target material inside a slot formed in the sensing device. A transmittance of the sensing device is adjusted according to concentration of the target material concentrated inside the slot by the squeegee.

8 Claims, 7 Drawing Sheets

SYSTEM AND METHOD FOR ADJUSTING TRANSMITTANCE FOR SUPERSENSITIVE OPTICAL SENSOR

CROSS-REFERENCE TO RELATED APPLICATION

This application claims priority to and the benefit of Korean Patent Application No. 2018-0000351, filed on Jan. 2, 2018, the disclosure of which is incorporated herein by reference in its entirety.

BACKGROUND

1. Field of the Invention

The present disclosure relates to a transmittance adjusting technique, and more particularly, to a system and method for adjusting transmittance for a supersensitive optical sensor, which adjust transmittance by allowing a target material desired to be sensed to be concentrated at a location at which electromagnetic waves of a specific band are strongly amplified and focused in a sensing device that is formed of a metamaterial having a slot structure.

2. Discussion of Related Art

Use of a technique for strongly amplifying and focusing electromagnetic waves having a specific wavelength by using a metamaterial allows electromagnetic waves to be collected in a very small region for wavelength beyond the wavelength limit, through which transmission or reflection efficiency can be increased more than 100 to 10,000 times compared to conventional simple electromagnetic wave oscillation elements. Such efficiency can be determined by the design of a metamaterial. For example, terahertz (THz) bands are known to have the natural absorption vibration modes for most materials, and the design of the metamaterial can be tailored to the natural absorption frequency of a particular material. Use of THz electromagnetic waves amplified and focused by a designed metamaterial allows a particular material to be detected at low concentrations with high sensitivity. In particular, since materials have a variety of natural absorption vibration modes, high selectivity can be imparted to a metamaterial according to the characteristics thereof. However, as the limit of a method for sensing a material by using a THz signal, an efficient concentration of a sensing material inside a sensing region has been pointed out.

In the related art, the entire solution including a target material desired to be sensed is dropped to the surface of a metamaterial by using a drop casting method, the solution is evaporated, and then a THz signal is measured in a dry sample state thereof. However, when the drop casting method is used, the target material is disproportionately distributed on the substrate of the metamaterial. In particular, while a natural phenomenon such as a coffee-ring effect causes a ring shape to be formed outside the solution, the target material is further flocculated outside, and the central portion of a droplet in which sensor units are relatively crowded, that is, the central portion of a drop of solution dropped to the surface of the metamaterial, becomes empty. Therefore, conventional methods have limitations that the disproportionate distribution of the target material limits the qualitative and quantitative sample analysis and an effective THz signal cannot be obtained from a low-concentration sample.

RELATED ART DOCUMENT

[Patent Document]
Patent Document 1: Korean Patent Registration No. 10-0849928
Patent Document 2: Korean Patent Publication No. 10-2012-0093629

SUMMARY OF THE INVENTION

The present disclosure is directed to providing a system and method for adjusting transmittance which concentrate a target material in nano or micron units in a hot spot in which a signal is best amplified in a sensing device that has a slot designed as a particular structure and amplifies the signal through a metamaterial.

The present disclosure is directed to providing a system and method for adjusting transmittance which sweep a target material away from a surface of a sensing device (a metamaterial) by using a squeegee capable of sliding so as to concentrate the target material inside a slot in which a signal is well amplified and which adjusts the concentration of the target material concentrated inside the slot so as to adjust the transmittance of the sensing device.

According to an aspect of the present disclosure, there is provided a system for adjusting transmittance including: a sensing device configured to amplify electromagnetic waves of a specific frequency; and a squeegee configured to concentrate a target material inside a slot formed in the sensing device, wherein a transmittance of the sensing device is adjusted according to concentration of the target material concentrated inside the slot by the squeegee.

The sensing device may include: a substrate; and a film disposed on the substrate, wherein the film may be patterned with the slot having a rectangular shape in an engraving manner such that the electromagnetic waves of the specific frequency are amplified.

The slot may be adjusted in width, thickness, and length according to the frequency of the electromagnetic waves.

The squeegee may be slid on a surface of the sensing device when a solvent including the target material is applied to the surface of the sensing device so as to sweep the solvent applied to the surface of the sensing device, and, while the solvent is swept, the target material included in the solvent may be positioned inside the slot of the sensing device.

As the number of times that the solvent is applied to the surface of the sensing device and the squeegee sweeps the solvent increases, the concentration of the target material concentrated inside the slot may be increased, and as the concentration of the target material concentrated inside the slot increases, the transmittance of the sensing device may be decreased.

The squeegee may be formed of polydimethylsiloxane.

According to an aspect of the present disclosure, there is provided a method for adjusting transmittance, which is performed by a system for adjusting transmittance comprising a sensing device configured to amplify electromagnetic waves of a specific frequency and a squeegee configured to concentrate a target material inside a slot formed in the sensing device, including: (a) applying a solvent including the target material on a surface of the sensing device; and (b) concentrating the target material inside the slot formed in the sensing device while the squeegee is slid on the surface of the sensing device to which the solvent is applied, wherein a transmittance of the sensing device is adjusted according to concentration of the target material concentrated inside the slot by the squeegee.

As a number of times that operations (a) and (b) are repeated increases, the concentration of the target material concentrated inside the slot may be increased, and as the concentration of the target material concentrated inside the slot increases, the transmittance of the sensing device may be decreased.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
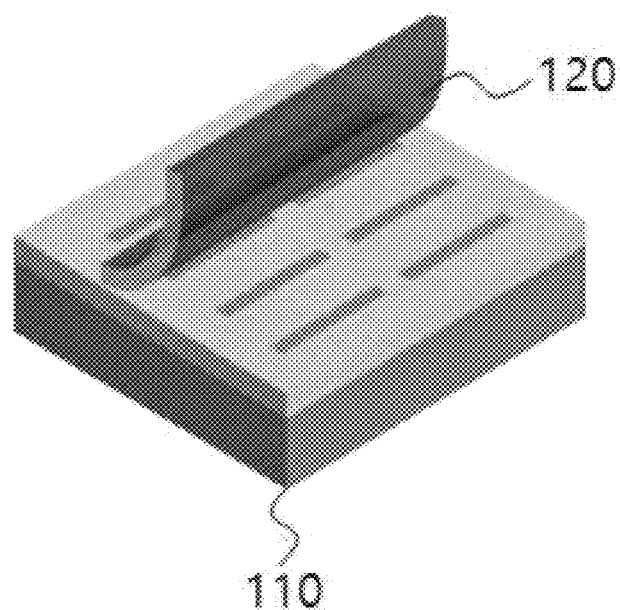
FIG. 1 is a view of a system for adjusting transmittance according to an exemplary embodiment of the present disclosure.

The advantages and features of the present disclosure and the methods for achieving them will hereinafter be made clear with reference to embodiments described below in detail with reference to the accompanying drawings. However, it should be understood that the present disclosure is not limited to the embodiments disclosed herein but may be embodied in other various forms. The present embodiments are provided so that this disclosure will be thorough and complete and will fully convey the scope of the invention to those skilled in the art to which the present disclosure pertains. The present disclosure is defined only by the scope of the claims. Like reference numerals refer to like elements throughout the specification. As used herein, the term "and/or" includes any and all combinations of one or more of the mentioned items.

Although the terms "first," "second," etc. may be used herein to describe various elements, components, and/or sections, these elements, components, and/or sections should not be limited by these terms. These terms are used to distinguish one element, component, or section from another. For example, a first element, component, or section may be termed a second element, component, or section within the technical scope of the present disclosure.

Further, indication references of steps (for example, a, b, and c) are used for convenience of explanation and do not indicate a sequence of the steps. Unless explicitly defined as a specific sequence in the context, the steps may be performed in a different order. That is, individual steps may be performed in the described order or in the reverse order, or may be substantially simultaneously conducted.

The terms used in the present specification are used for explaining the embodiments, not for limiting the present disclosure. Thus, an expression used in a singular form in the present specification also includes the expression in its plural form unless otherwise specified in context. The terms "comprises" and/or "comprising," when used in this specification, specify the presence of stated components, steps, operations, and/or elements, but do not preclude the presence or addition of one or more other components, steps, operations, and/or elements.

Unless otherwise defined, all terms (including technical and scientific terms) used herein have the same meaning as commonly understood by those skilled in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly defined as such herein.

Further, well-known functions and/or configurations will not be described in detail if they would unnecessarily obscure the gist of the present disclosure. Further, the terms to be described below are defined in consideration of functions thereof in the embodiments of the present disclosure and vary depending on a user's or operator's intention or practice. Accordingly, the definition is made on the basis of the content throughout the present disclosure.

FIG. 1 is a view of a system for adjusting transmittance according to an exemplary embodiment of the present disclosure.

The present disclosure relates to adjusting transmittance (or reflectance) by using a metamaterial specific to light or electromagnetic waves including a terahertz (THz) signal, and, referring to FIG. 1, a system 100 for adjusting transmittance includes a sensing device 110 and a squeegee 120.

Figure 2:
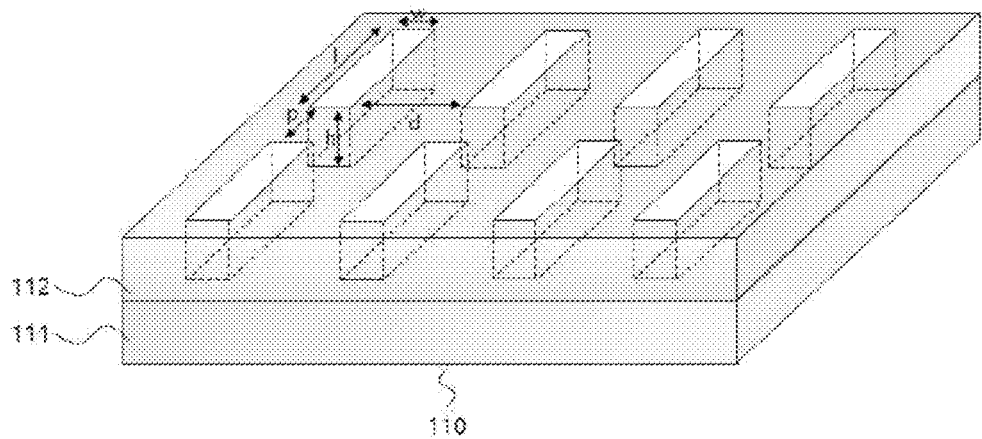
FIG. 2 is a view of a sensing device according to an embodiment.

The sensing device 110 amplifies or focuses electromagnetic waves of a specific frequency. Referring to FIG. 2, the sensing device 110 may include a substrate 111 and a film 112 disposed on the substrate 111, and the film 112 may be patterned with slots having a rectangular shape so that the electromagnetic waves of the specific frequency are amplified. The structure itself of the film 112 is referred to as a metamaterial. In this case, the substrate 111 of the sensing device 110 may be formed of quartz, silicon, sapphire, or glass, and the film 112 may be formed of gold, silver, copper, or aluminum.

The shape of the slots may be variously changed into a rectangular shape, a circular shape, or the like. For example, when the shape of the slots is a rectangular shape, a width w, a length l, and a height h of the slots and distances d and p between adjacent slots may be adjusted accofirding to the frequency of the electromagnetic waves that will be used to detect a target material. Further, the sensing device 110 including nanoscale slots may be fabricated on a silicon wafer through an E-beam lithography process and a lift-off process, through which more than 1,000 slots may be produced in one sample.

Figure 3:
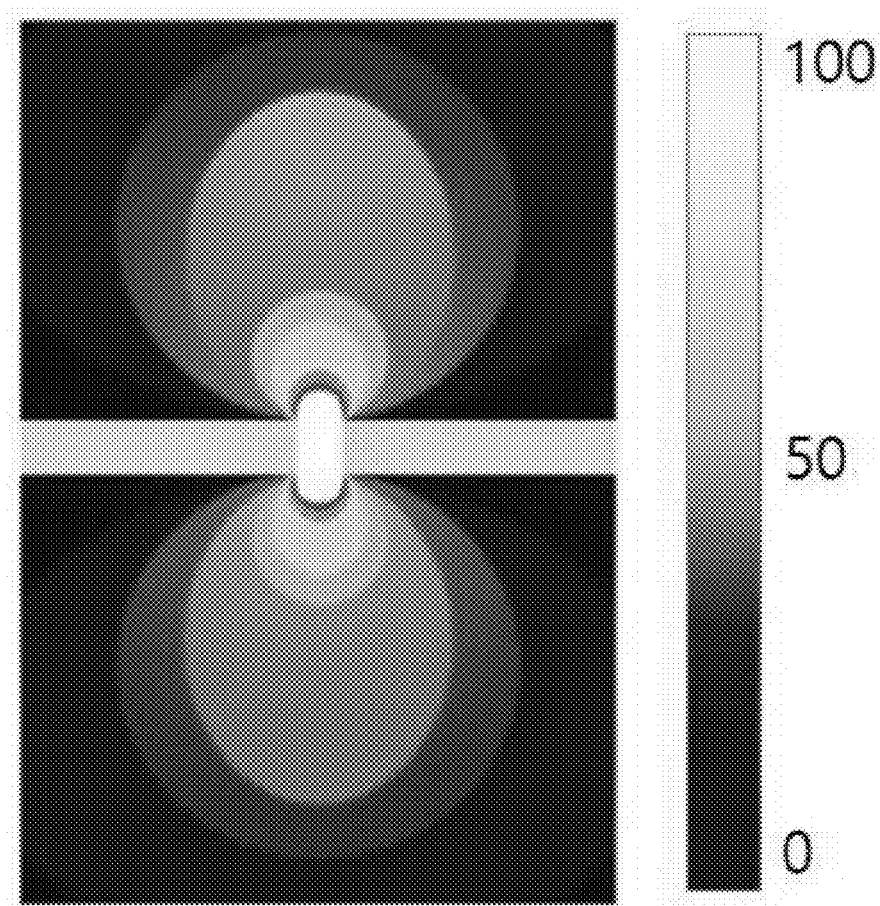
FIG. 3 is a view illustrating the distribution of electromagnetic waves at a cross section of a slot of the sensing device according to an embodiment.

In addition, referring to FIG. 3, an amplification phenomenon is shown for the electromagnetic waves when the electromagnetic waves are incident into the slots of the sensing device 110 that have the rectangular shape. It can be seen that the electromagnetic waves incident into the slots show the distribution that the electromagnetic waves are gathered in the slots, as in a funnel, and spread again and, while the electromagnetic waves focused at cross sections of the slots spread while moving farther away from the slots, the intensity thereof is reduced. That is, a high amplification phenomenon for the electromagnetic waves occurs inside and near the slots, and, in order for the target material to be efficiently sensed, the electromagnetic waves need to be focused on internal spaces of the slots. As a result, sensitivity resulting from amplification of the electromagnetic waves increases, which may be used even for detection of a micro-fine size or trace of material.

The squeegee 120 concentrates the target material inside the slots formed in the sensing device 110. Preferably, the squeegee 120 may be moved in a sliding manner to sweep a surface of the sensing device 110. In this case, the squeegee 120 may be slid by a user's operation. Further, as the squeegee 120 sweeps the surface of the sensing device 110, the target material, which is included in a solvent applied to the surface of the sensing device 110, may be concentrated inside the slots of the sensing device 110. In this case, the transmittance of the sensing device 110 may be adjusted according to the concentration of the target material concentrated inside the slots of the sensing device 110, which will be described below in more detail.

Preferably, the squeegee 120 may be formed of an elastic material corresponding to polydimethylsiloxane (PDMS). More particularly, the squeegee 120 may be formed by mixing PDMS with a curing agent and a silicon-based elastic body at a volumetric ratio of 1 to 10, curing the mixture on a hot plate at a temperature of 80° C. for 3 hours, and then cutting the cured mixture into a 5 mm×10 mm piece. In this case, the ratio of the curing agent to the silicon-based elastic body, the curing time and temperature thereof, and the size thereof for forming the squeegee 120 may be changed according to the purpose of use and shape of the squeegee 120. The squeegee 120 may not cause any functional or structural transformation in the measurement of the transmittance of the sensing device 110 without any damage to the surface of the sensing device 110.

Figure 4:
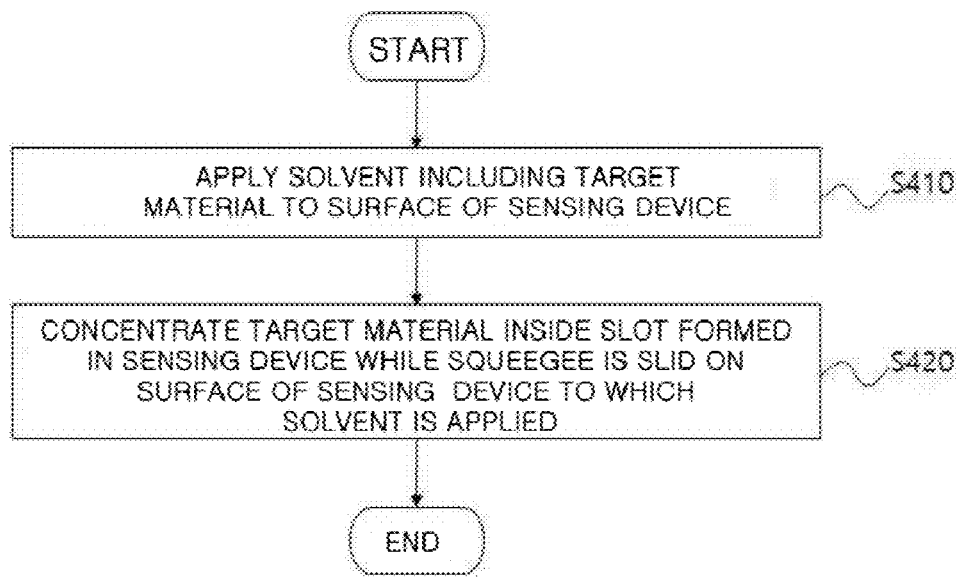
FIG. 4 is a flowchart of a method for adjusting transmittance according to an embodiment.

FIG. 4 is a flowchart of a method for adjusting transmittance according to an embodiment.

Figure 5:
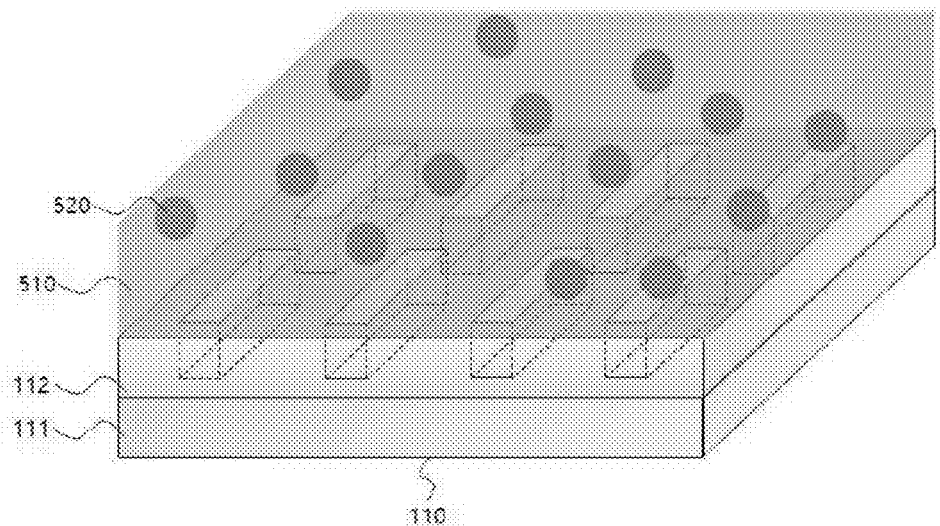
FIGS. 5 to 7 are examples for illustrating the method for adjusting transmittance according to embodiments.

Referring to FIG. 4, the method for adjusting transmittance is performed through the sensing device 110 and the squeegee 120 of the system 100 for adjusting transmittance that is described with reference to FIG. 1. First, the solvent including the target material is applied to the surface of the sensing device 110 (S410). An evaporative solution such as water may be used as the solvent, and the solvent may be applied by the user in a drop casting method. More particularly, as illustrated in FIG. 5, a solvent 510 having target materials 520 uniformly spread therein is applied to the surface of the sensing device 110. In this case, the target material 520 is captured and concentrated inside the slots. Thus, the size of the target material 520 needs to be smaller than the width of the slots, and the concentration of the solvent or the number of target materials may be changed according to circumstances. For example, when the slots of the sensing device 110 have the dimensions: a height h of 150 nm, a length l of 60 μm, a width w of 130 or 500 nm, a distance p between adjacent slots of 10 μm, and a distance d between adjacent slots of 40 μm, the solvent including the target material (for example, a gold nanoparticle) prepared at a concentration of $2.75 \times 10^9$/mL in a fixed amount of 30 uL and having a diameter of 80 nm may be applied to the slots.

Further, the solvent may be applied to cover a region wider than the outermost portion of the slots formed in the sensing device 110, and, for example, a droplet of a solution having a volume of 30 uL may be applied to the surface of the sensing device 110 so as to entirely cover a 1.6 mm×1.6 mm region, which is the outermost portion of the slots formed in the sensing device 110.

After the solvent applied to the slots is completely dried, water may be applied to the dried sample in a spraying manner before the squeegee 120 is slid in operation S420 that will be described below so that a thin water nanolayer is formed on the surface of the slots. The formation of the water nanolayer connecting nanoscale target materials is maintained for several seconds, which may serve to ease the movement of the squeegee 120.

Figure 6:
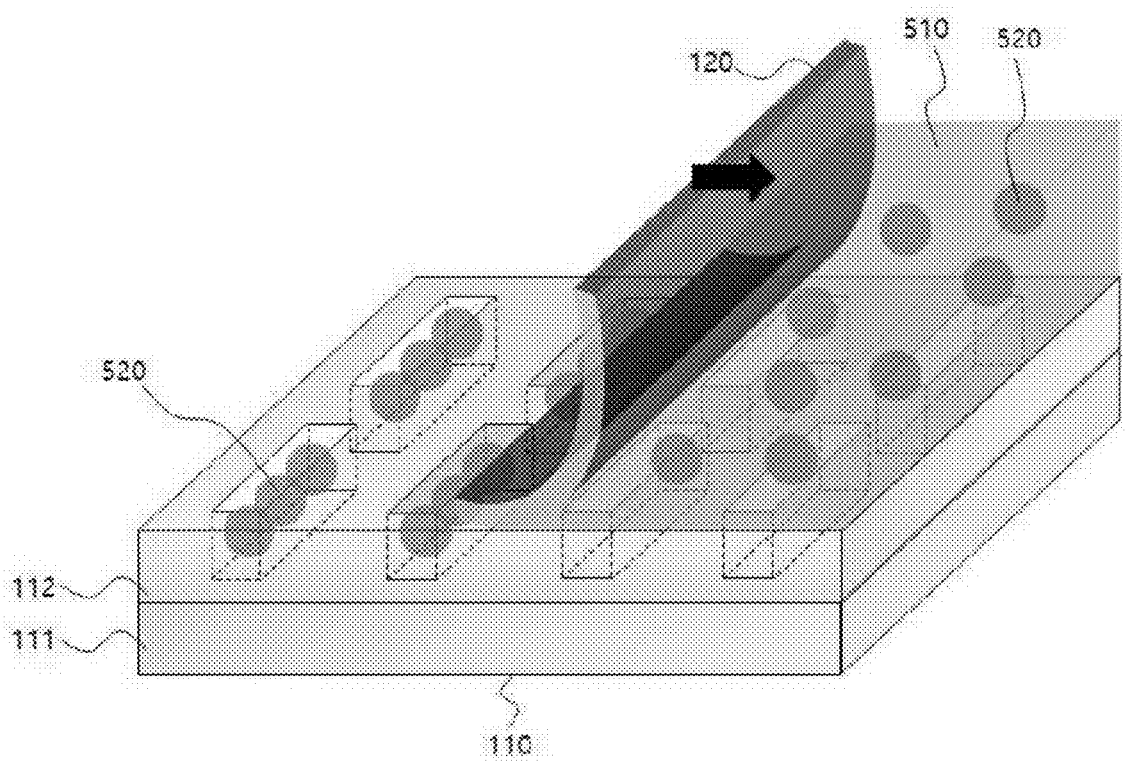

Then, while the squeegee 120 is slid on the surface of the sensing device 110 to which the solvent is applied, the target material is concentrated inside the slots formed in the sensing device 110 (S420). The nanoscale target materials are concentrated in the nanoscale slots. More particularly, the squeegee 120 may be slid by the user's hand in a direction perpendicular to a longitudinal direction of the slots. Referring to FIG. 6, while the squeegee 120 is slid on the surface of the sensing device 110 with a constant force, the squeegee 120 sweeps the solvent 510 applied to the surface of the sensing device 110 and, at the same time, the target material 520 included in the solvent is positioned inside the slots of the sensing device 110. The squeegee 120 sweeps the target material 520 to the inside of the slots in which a signal is well amplified. Preferably, the process of sweeping the solvent 510 applied to the surface of the sensing device 110 by the squeegee 120 may be repeated multiple times. For example, when the solvent is applied to the surface of the sensing device 110, the squeegee 120 may repeatedly sweep the surface of the sensing device 110 three times. In this case, the solvent included inside the slots together with the target material 520 is evaporated.

Figure 7:
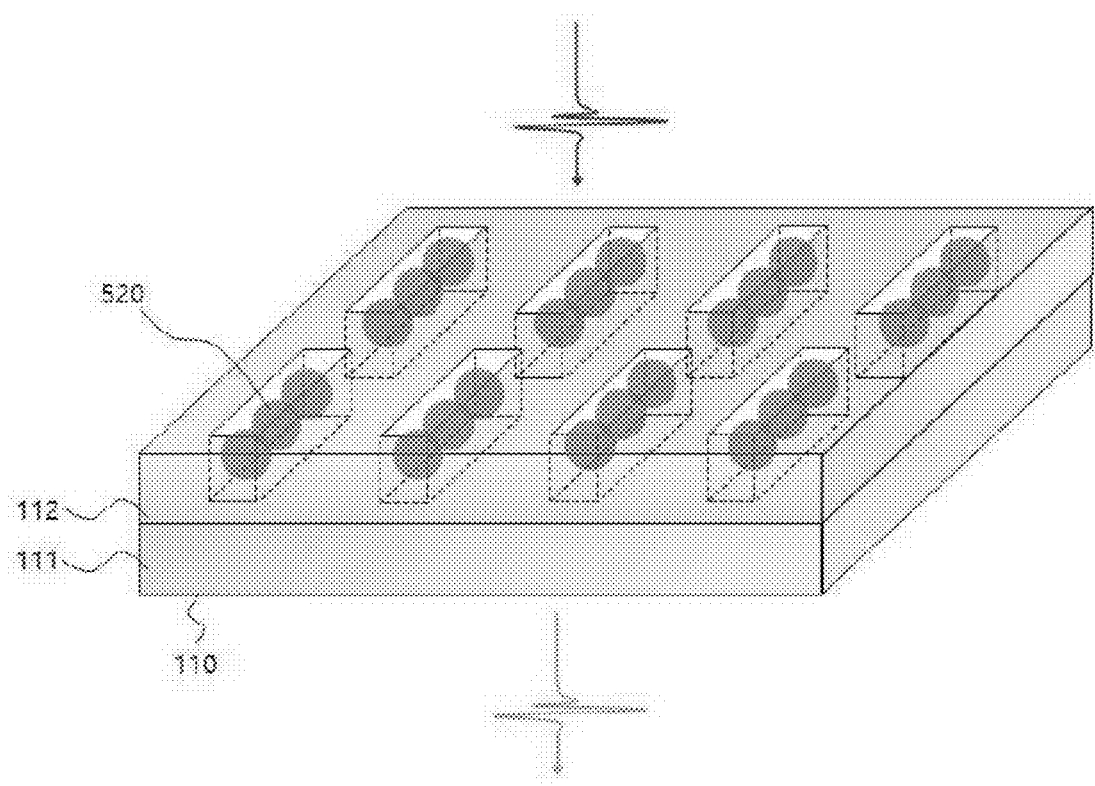

When operations S410 and S420 are performed, the target material 520 is concentrated inside the slots of the sensing device 110, as illustrated in FIG. 7. Then, the electromagnetic waves of the specific frequency are generated from a light source such that the electromagnetic waves pass through the sensing device 110 in which the target material 520 is concentrated inside the slots. A signal passing through the sensing device 110 is detected by a detector (not illustrated in the drawings). In response to the signal detected by the detector, the quantitative and qualitative characteristics of the target material 520 are all measured, and thus the type and concentration thereof may be determined.

In an embodiment, the processes illustrated in FIGS. 5 to 7 may be repeated. That is, the solvent 510 is applied to the surface of the sensing device 110, the squeegee 120 sweeps the solvent 510 so as to position the target material 520 inside the slots, and the transmittance of the sensing device 110 is measured. Then, in that state, the solvent 510 is repeatedly applied to the surface of the sensing device 110, the squeegee 120 sweeps the solvent 510 so as to position the target material 520 inside the slots, and the transmittance is repeatedly measured. The repetition of such processes allows the concentration of the target material 520 included in the slots to be increased, and thus the transmittance of the sensing device 110 is decreased.

Preferably, the repetition of applying the solvent 510, sweeping the solvent 510 by the squeegee 120, and measuring the transmittance allows an amount of the target material 520 concentrated inside the slots to be increased to thus decrease the transmittance. Thus, the repetition of the above processes allows the concentrated amount of the target material 520 positioned inside the slots to be adjusted.

FIG. 8 is a view for illustrating the effects of the system and method for adjusting transmittance according to an embodiment.

Figure 8A:
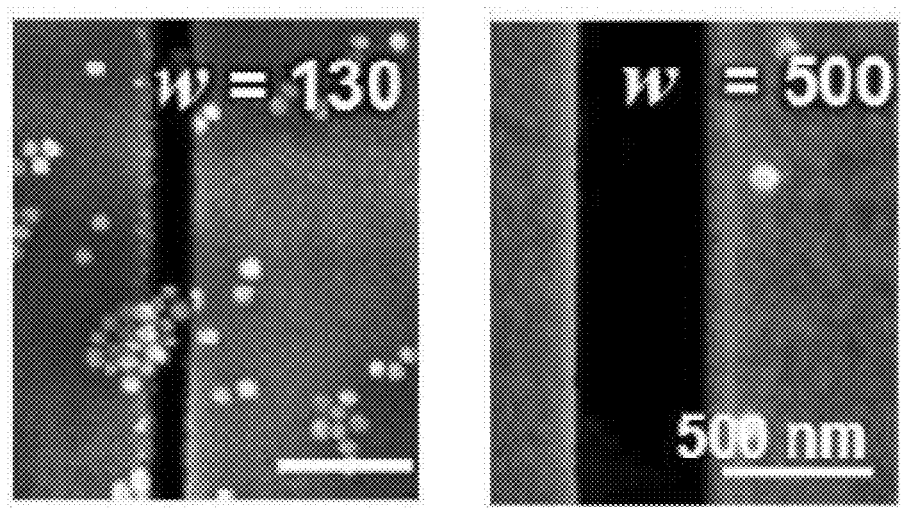
FIG. 8A shows results wherein the target material is concentrated inside the slots by a conventional drop casting method.
Figure 8B:
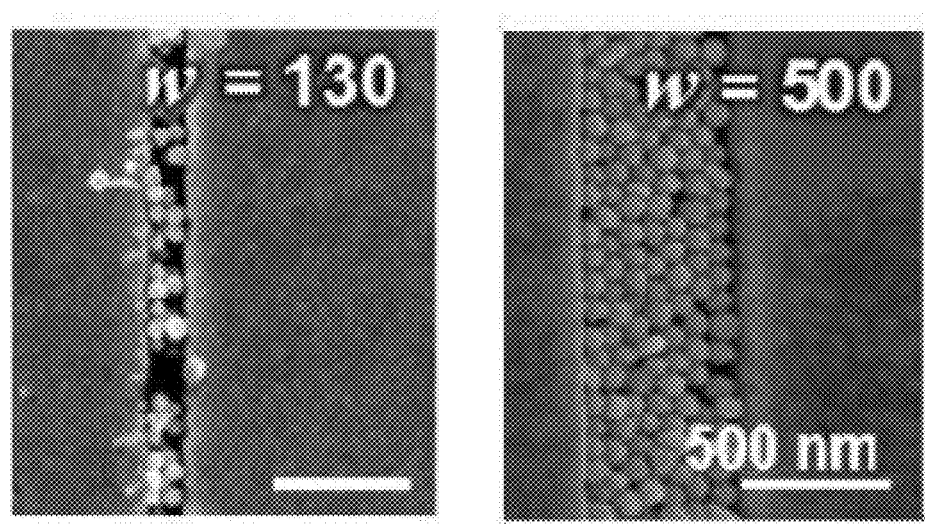
FIG. 8B shows results wherein the target material is concentrated inside the slots by the method according to the present disclosure.

Referring to FIG. 8, results are shown wherein the target material is concentrated in the slots having widths w of 130 nm and 500 nm. FIG. 8A shows results wherein the target material is concentrated inside the slots by a conventional drop casting method, and FIG. 8B shows results wherein the target material is concentrated inside the slots by the method according to the present disclosure.

The conventional drop casting method as a sample exposure method drops the solvent including the target material to the surface of the sensing device 110 and evaporates the solvent. As illustrated in FIG. 8A, it can be seen that the target material is randomly scattered without being concentrated in a specific region.

In contrast, by the system and method for adjusting transmittance according to the present disclosure, the solvent including the target material is dropped to the surface of the sensing device 110 and swept the target material into the slots of the sensing device 110 while the solvent is swept by using the squeegee 120 before the solvent is evaporated. As illustrated in FIG. 8B, it can be seen that the target material is not concentrated in the specific region, that is, only inside the slots, and the target material is not left in a portion other than the inside of the slots. In detail, the ratio of a portion of the target material present inside the slots to the other portion present outside the slots is greater than or equal to 80% when the width w of the slots is 130 nm and greater than or equal to 95% when the width w of the slots is 500 nm.

The signal intensity of the electromagnetic waves is determined depending on how much target material is positioned in the slots of the sensing device 110 that correspond to sensing regions for sensing the target material. The conventional drop casting method randomly scatters the target material without concentrating the target material in the slots. Thus, there is no alternative but to depend on a method for applying a high concentration of a sample in order to concentrate a greater amount of the target material in the slots. However, the present disclosure may concentrate the target material in the slots even when using a minute concentration of the sample, thereby innovatively reducing the amount of the sample.

FIG. 9 is a view for illustrating the effects of the system and method for adjusting transmittance according to an embodiment.

Figure 9A:
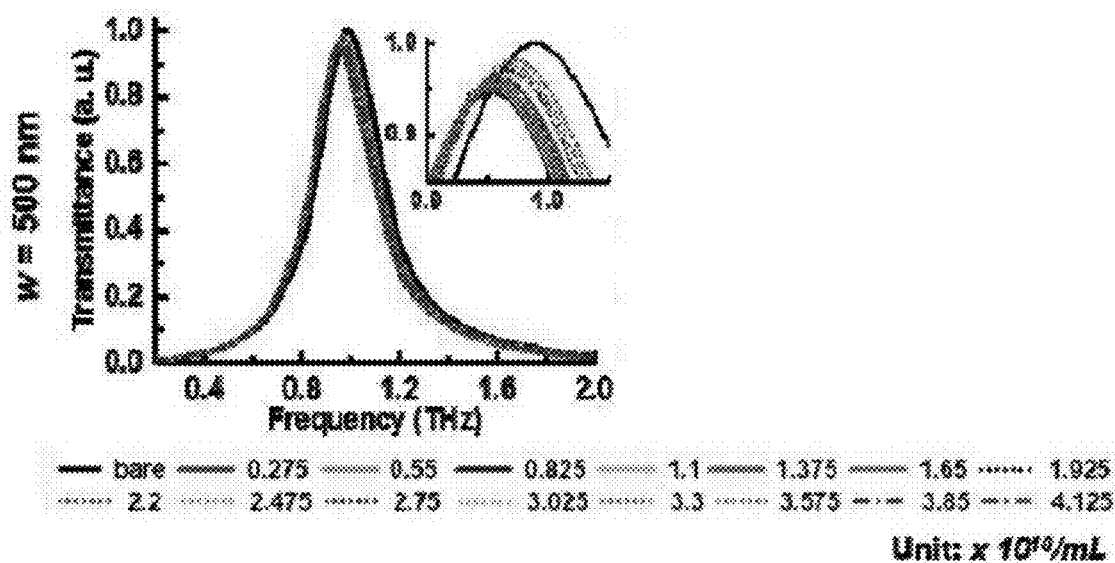
FIG. 9A is a result obtained by the conventional drop casting method.
Figure 9B:
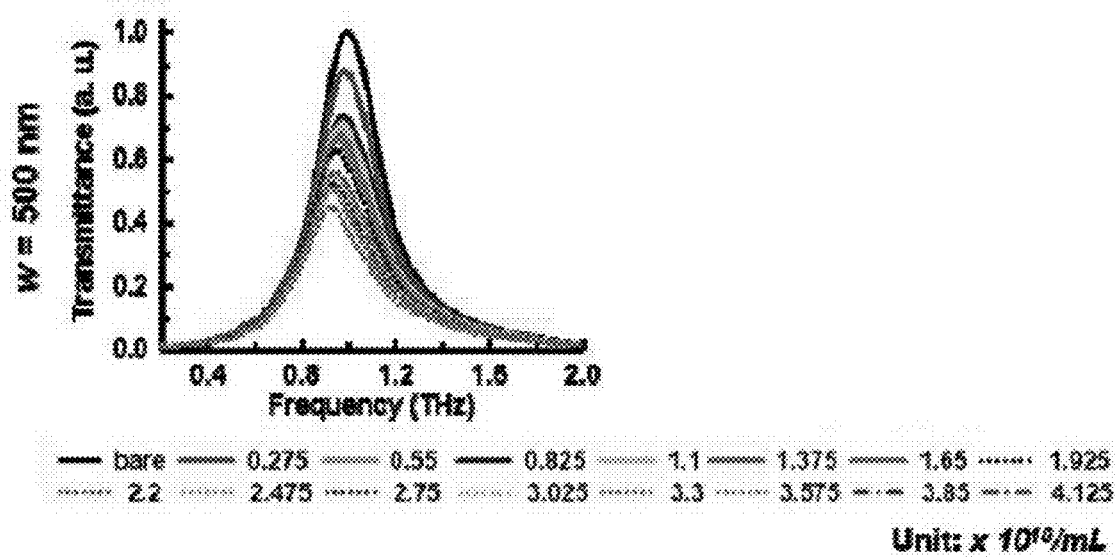
FIG. 9B is a result obtained by the method according to the present disclosure.

Referring to FIG. 9, results are shown as graphs obtained by measuring the transmittance of the electromagnetic waves while repeating the process of concentrating the target material in the slots having the width w of 500 nm. FIG. 9A is a result obtained by the conventional drop casting method, and FIG. 9B is a result obtained by the method according to the present disclosure. The graphs illustrated in FIGS. 9A and 9B show the transmittance of the electromagnetic waves measured by repeatedly applying the solvent having a concentration of 0.275 and then performing the processes according to the respective methods. "Bare" refers to a state in which the solvent is not applied, "0.275," a state in which the solvent is applied once, "0.55," a state in which the solvent is applied twice, . . . , "4.125," the transmittance of the electromagnetic waves measured in a state in which the solvent is applied 15 times.

Referring to FIG. 9A, a result is shown wherein, according to the conventional drop casting method, a process of dropping the solvent including the target material to the surface of the sensing device 110, evaporating the dropped solvent, and measuring the transmittance is repeated. It can be seen that the transmittance is decreased to a certain degree by performing the process one or two times and the transmittance is stagnated without being decreased at a specific limit value. In detail, referring the graph inserted in an upper part of FIG. 9A, it is shown that the distribution of the graph of a 0.9 to 1.1 THz signal was extended. It can be seen that, after the transmittance is decreased by the repetition of the process one or two times, the transmittance is maintained at about the same level even when the number of instances of repetition increases.

In contrast, referring to FIG. 9B, a result is shown wherein, according to the present disclosure, the process of dropping the solvent including the target material to the surface of the sensing device 110 and sweeping the surface of the sensing device 110 by using the squeegee 120 and measuring the transmittance is repeated three times. It can be seen that the repetition of the process allows the concentration (density) of the target material inside the slots to be gradually increased and thus the transmittance is gradually decreased.

Thus, the present disclosure may actively adjust a degree of the concentration of the target material such that a desired level of sensing efficiency is exhibited, thereby being capable of a gradual transmittance adjustment using the electromagnetic waves. That is, the number of times that the process is performed may be adjusted so that the transmittance is accurately controlled, through which an accurately controlled concentration of the target material may be inserted in the slots. Thus, sensitivity of a level comparable to that in a conventional biosensor or mass spectrometry may be achieved.

According to the present disclosure as described above, since a target material is concentrated in a region in which a signal is well amplified, use of a low concentration of sample allows high signal strength to be obtained, and the concentration of the concentrated target material can be easily adjusted, thereby obtaining the rate of change of a quantified signal depending on the adjusting of the concentration. That is, the target material can be actively concentrated such that a desired level of sensing efficiency is exhibited.

Further, the present disclosure can be applied throughout sensing technology fields for measuring a small structure and a molecular sample of a nano or micron size and can be applied as a technique for implementing novel molecular sensing on the basis of the fact that various materials have strong absorption and spectroscopic properties in a terahertz frequency range.

Although the exemplary embodiments of the system and method for adjusting transmittance for a supersensitive optical sensor according to the present disclosure have been described above, the present disclosure is not limited thereto, and various modifications can be made and carried out within the scope of the claims, the detailed description of the invention, and the appended drawings, and also fall within the scope of the invention.

What is claimed is:
1. A system for adjusting transmittance, comprising:
 a sensing device configured to amplify electromagnetic waves of a specific frequency; and
 a squeegee for concentrating a target material inside a slot formed in the sensing device, wherein a transmittance of the sensing device is adjusted according to concentration of the target material concentrated inside the slot by the squeegee.

2. The system of claim 1, wherein the sensing device includes:
   a substrate; and
   a film disposed on the substrate,
   wherein the film is patterned with the slot having a rectangular shape in an engraving manner such that the electromagnetic waves of the specific frequency are amplified.

3. The system of claim 2, wherein the slot is adjusted in width, thickness, and length according to the frequency of the electromagnetic waves.

4. The system of claim 1, wherein the squeegee is slid on a surface of the sensing device when a solvent including the target material is applied to the surface of the sensing device so as to sweep the solvent applied to the surface of the sensing device, and, while the solvent is swept, the target material included in the solvent is positioned inside the slot of the sensing device.

5. The system of claim 4, wherein, as the number of times that the solvent is applied to the surface of the sensing device and the squeegee sweeps the solvent increases, the concentration of the target material concentrated inside the slot is increased, and as the concentration of the target material concentrated inside the slot increases, the transmittance of the sensing device is decreased.

6. The system of claim 1, wherein the squeegee is formed of polydimethylsiloxane.

7. A method for adjusting transmittance, which is performed by a system for adjusting transmittance comprising a sensing device configured to amplify electromagnetic waves of a specific frequency and a squeegee configured to concentrate a target material inside a slot formed in the sensing device, the method comprising:
   (a) applying a solvent including the target material on a surface of the sensing device; and
   (b) concentrating the target material inside the slot formed in the sensing device while the squeegee is slid on the surface of the sensing device to which the solvent is applied,
   wherein a transmittance of the sensing device is adjusted according to concentration of the target material concentrated inside the slot by the squeegee.

8. The method of claim 7, wherein, as a number of times that operations (a) and (b) are repeated increases, the concentration of the target material concentrated inside the slot is increased, and as the concentration of the target material concentrated inside the slot increases, the transmittance of the sensing device is decreased.

* * * * *